(12) United States Patent  
de Paz

(10) Patent No.: US 8,749,484 B2
(45) Date of Patent: Jun. 10, 2014

(54) MULTI-SCREEN USER INTERFACE WITH ORIENTATION BASED CONTROL

(75) Inventor: Alex de Paz, Burlington (CA)

(73) Assignee: Z124, George Town (KY)

( * ) Notice: Subject to any disclaimer, the term of this patent is extended or adjusted under 35 U.S.C. 154(b) by 665 days.

(21) Appl. No.: 12/948,682

(22) Filed: Nov. 17, 2010

(65) Prior Publication Data

US 2012/0081277 A1  Apr. 5, 2012

Related U.S. Application Data

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
*G09G 5/00* (2006.01)
(52) U.S. Cl.
USPC .............................. 345/156; 345/169; 345/173
(58) Field of Classification Search
USPC .................................................. 345/156–173
See application file for complete search history.

(56) References Cited

U.S. PATENT DOCUMENTS

| | | | |
|---|---|---|---|
| 6,331,840 B1 | 12/2001 | Nielson et al. | |
| 6,545,669 B1 | 4/2003 | Kinawi et al. | |
| 6,919,864 B1 | 7/2005 | Macor | |
| 7,289,083 B1 | 10/2007 | Canova, Jr. | |
| 7,432,876 B2 | 10/2008 | Okuley | |
| 7,839,419 B2 | 11/2010 | Hanggie et al. | |
| 7,996,045 B1 | 8/2011 | Bauer et al. | |
| 8,228,292 B1 * | 7/2012 | Ruiz et al. | 345/156 |
| 8,261,213 B2 | 9/2012 | Hinckley et al. | |
| 8,289,292 B2 | 10/2012 | Sip | |
| 8,356,258 B2 | 1/2013 | Matthews et al. | |
| 2002/0097194 A1 | 7/2002 | Uchida et al. | |
| 2003/0059003 A1 | 3/2003 | Lewis | |
| 2005/0289478 A1 | 12/2005 | Landman et al. | |
| 2006/0012951 A1 | 1/2006 | Kim | |
| 2006/0082518 A1 | 4/2006 | Ram | |
| 2006/0206825 A1 | 9/2006 | Dorn et al. | |
| 2006/0211454 A1 | 9/2006 | Park et al. | |

(Continued)

FOREIGN PATENT DOCUMENTS

EP  1775925  4/2007

OTHER PUBLICATIONS

International Preliminary Report on Patentability for International (PCT) Patent Application No. PCT/US2011/053849, mailed Apr. 11, 2013 6 pages.

(Continued)

*Primary Examiner* — Viet Pham
(74) *Attorney, Agent, or Firm* — Sheridan Ross P.C.

(57) ABSTRACT

Control of a plurality of displays of a computing device in response to the change in orientation of the computing device. The computing device may be a handheld computing device with a plurality of displays that are concurrently visible by a user. The displays may be capable of displaying a graphical user interface (GUI). The plurality of displays may be modified in response to a change in orientation of the handheld computing device. The modification may include expanding a GUI that is displayed in a single display when in a first orientation to occupy at least two of the plurality of displays in response to the change in orientation.

20 Claims, 14 Drawing Sheets

(56) References Cited

U.S. PATENT DOCUMENTS

| | | |
|---|---|---|
| 2006/0227106 A1 | 10/2006 | Hashimoto et al. |
| 2007/0198948 A1 | 8/2007 | Toriyama |
| 2008/0036743 A1 | 2/2008 | Westerman et al. |
| 2008/0059915 A1 | 3/2008 | Boillot |
| 2008/0062625 A1 | 3/2008 | Batio |
| 2008/0122796 A1 | 5/2008 | Jobs et al. |
| 2008/0165144 A1 | 7/2008 | Forstall et al. |
| 2008/0174570 A1 | 7/2008 | Jobs et al. |
| 2009/0119678 A1 | 5/2009 | Shih et al. |
| 2009/0235203 A1 | 9/2009 | Iizuka |
| 2009/0254861 A1 | 10/2009 | Seetharamakrishnan et al. |
| 2009/0262074 A1* | 10/2009 | Nasiri et al. .................. 345/158 |
| 2009/0291760 A1 | 11/2009 | Hepburn et al. |
| 2009/0298548 A1 | 12/2009 | Kim et al. |
| 2010/0064244 A1 | 3/2010 | Kilpatrick, II et al. |
| 2010/0064536 A1* | 3/2010 | Caskey et al. .................. 33/303 |
| 2010/0079355 A1 | 4/2010 | Kilpatrick, II et al. |
| 2010/0081475 A1 | 4/2010 | Chiang et al. |
| 2010/0085274 A1 | 4/2010 | Kilpatrick, II et al. |
| 2010/0085382 A1 | 4/2010 | Lundqvist et al. |
| 2010/0088532 A1 | 4/2010 | Pollock et al. |
| 2010/0088634 A1 | 4/2010 | Tsuruta et al. |
| 2010/0100842 A1 | 4/2010 | Kim |
| 2010/0137027 A1 | 6/2010 | Kim |
| 2010/0162128 A1 | 6/2010 | Richardson et al. |
| 2010/0164836 A1 | 7/2010 | Liberatore |
| 2010/0182247 A1 | 7/2010 | Petschnigg et al. |
| 2010/0182251 A1 | 7/2010 | Hong et al. |
| 2010/0182265 A1 | 7/2010 | Kim et al. |
| 2010/0211872 A1 | 8/2010 | Rolston et al. |
| 2010/0223553 A1 | 9/2010 | Madden |
| 2010/0227651 A1 | 9/2010 | Kim |
| 2010/0245209 A1 | 9/2010 | Miller et al. |
| 2010/0245240 A1 | 9/2010 | Heringslack et al. |
| 2010/0245256 A1 | 9/2010 | Estrada et al. |
| 2010/0262554 A1 | 10/2010 | Elliott |
| 2010/0280676 A1 | 11/2010 | Pabon et al. |
| 2010/0298032 A1 | 11/2010 | Lee et al. |
| 2010/0304791 A1 | 12/2010 | Lee et al. |
| 2010/0305843 A1 | 12/2010 | Yan et al. |
| 2010/0313156 A1 | 12/2010 | Louch et al. |
| 2010/0321275 A1* | 12/2010 | Hinckley et al. ............... 345/1.3 |
| 2011/0025625 A1 | 2/2011 | Hirako |
| 2011/0074717 A1 | 3/2011 | Yamashita |
| 2011/0107272 A1 | 5/2011 | Aguilar |
| 2011/0128241 A1 | 6/2011 | Kang et al. |
| 2011/0157057 A1 | 6/2011 | Hata |
| 2011/0175805 A1* | 7/2011 | Rottler et al. .................. 345/156 |
| 2011/0187662 A1 | 8/2011 | Lee et al. |
| 2011/0209058 A1 | 8/2011 | Hinckley et al. |
| 2011/0210922 A1 | 9/2011 | Griffin |
| 2011/0230178 A1 | 9/2011 | Jones et al. |
| 2011/0239142 A1 | 9/2011 | Steeves et al. |
| 2012/0005602 A1 | 1/2012 | Anttila et al. |
| 2012/0054401 A1 | 3/2012 | Cheng |
| 2012/0081270 A1 | 4/2012 | Gimpl et al. |
| 2012/0081302 A1 | 4/2012 | Gimpl et al. |
| 2012/0081400 A1 | 4/2012 | Schrock et al. |
| 2012/0084674 A1 | 4/2012 | Visosky |
| 2012/0084676 A1 | 4/2012 | de Paz |
| 2012/0084693 A1 | 4/2012 | Sirpal et al. |
| 2012/0084720 A1 | 4/2012 | Sirpal et al. |
| 2012/0084722 A1 | 4/2012 | Cassar et al. |
| 2012/0174028 A1 | 7/2012 | Sirpal et al. |
| 2012/0246374 A1 | 9/2012 | Fino |
| 2012/0280924 A1 | 11/2012 | Kummer et al. |
| 2012/0297304 A1 | 11/2012 | Maxwell |
| 2012/0299554 A1 | 11/2012 | Kruglick |
| 2013/0021262 A1 | 1/2013 | Chen |
| 2013/0120251 A1 | 5/2013 | Lee et al. |

OTHER PUBLICATIONS

International Preliminary Report on Patentability for International (PCT) Patent Application No. PCT/US2011/053914, mailed Apr. 11, 2013 6 pages.

International Preliminary Report on Patentability for International (PCT) Patent Application No. PCT/US2011/054032, mailed Apr. 11, 2013 8 pages.

Extended Search Report for European Patent Application No. 12180497.5, dated Nov. 21, 2012 8 pages.

International Preliminary Report on Patentability for International (PCT) Patent Application No. PCT/US2011/052811, mailed Apr. 11, 2013 6 pages.

Official Action for U.S. Appl. No. 13/247,787, mailed Feb. 28, 2013 16 pages.

Official Action for U.S. Appl. No. 13/247,787, mailed Jun. 17, 2013 20 pages.

Official Action for U.S. Appl. No. 13/247,823, mailed May 23, 2013 20 pages.

Official Action for U.S. Appl. No. 13/247,514, mailed Jun. 17, 2013 30 pages.

Official Action for U.S. Appl. No. 13/365,148, mailed Mar. 28, 2013 15 pages.

Official Action for U.S. Appl. No. 13/248,199, mailed Jun. 14, 2013 15 pages.

Google images, accessed Apr. 18, 2011, 6 pages.

"Lapdock™ for Motorola Atrix," at www.motorola.com/Consumers/US-EN/Consumer-Product-and-Services/Mobile . . . , accessed Apr. 18, 2011, 1 page.

"Motorola Atrix 4G Laptop Dock Review," at www.phonearena.com/reviews/Motorola-ATRIX-4G-Laptop-Dock-Review_id2667, Mar. 2, 2011, 6 pages.

Website entitled, "Kyocera Echo," at www.echobykyocera.com/, 2011, 6 pages.

Website entitled, "Sony Tablet," at store.sony,com/webapp/wcs/stores/servlet/CategoryDisplay?catalogId=10551&storeId=10151&langId=-1&categoryId=8198552921644795521, 2011, 3 pages.

Burns, "Motorola Atrix 4G Laptop Dock Review," at www.androidcommunity.com/motorola-atrix-4g-laptop-dock-review-20110220/, Feb. 20, 2011, 5 pages.

U.S. Appl. No. 13/341,634, filed Dec. 30, 2011, Selim.
U.S. Appl. No. 13/341,666, filed Dec. 30, 2011, Selim.
U.S. Appl. No. 13/365,148, filed Feb. 2, 2012, Reeves et al.
U.S. Appl. No. 13/365,153, filed Feb. 2, 2012, Reeves et al.
U.S. Appl. No. 13/365,157, filed Feb. 2, 2012, Reeves et al.
U.S. Appl. No. 13/627,680, filed Sep. 26, 2012, Sirpal et al.

Catacchio, "This smartphone has two huge screens . . . that rotate," The Next Web at www.thenextweb.com/asia/2010/10/07/this-smartphone-has-two-huge-screens-that-rotate/, Jul. 21, 2011, 2 pages.

Harman03, "Kyocera Echo Dual-screen Android Phone," posted 4 weeks from Apr. 18, 2011, 3 pages.

Hinckley et al. "Codex: A Dual Screen Tablet Computer," CHI 2009~New Mobile Interactions, Apr. 4-9, 2009, pp. 1933-1942 (www.dgp.utoronto.ca/~ravin/papers/chi2009_codex.pdf).

Lee "Developing Orientatin-Aware Android Application," Jun. 11, 2010, 9 pages (www.devx.com/wireless/Article/40792/1954).

Martelin "Orientation Awareness in Declarative User Interface Languages for Mobile Devices: A Case Study and Evaluation," Jun. 1, 2010, 79 pages (lib.tkk.fi/Dipl/2010/urn100291.pdf).

Stein, S., "How does the Motorola Atrix 4G Lapdock compare with a laptop?" Crave—CNET, at www.news.cnet.com/8301-17938_105-20031251-1.html, Feb. 9, 2011, 7 pages.

International Search Report and Written Opinion for International (PCT) Patent Application No. PCT/US11/53849, mailed Feb. 27, 2012 7 pages.

International Search Report and Written Opinion for International (PCT) Patent Application No. PCT/US11/53884, mailed Feb. 28, 2012 19 pages.

International Search Report and Written Opinion for International (PCT) Patent Application No. PCT/US11/53914, mailed Feb. 21, 2012 7 pages.

(56) References Cited

OTHER PUBLICATIONS

International Search Report and Written Opinion for Internatioanl (PCT) Patent Application No. PCT/US11/54032, mailed Feb. 22, 2012 9 pages.
International Search Report and Written Opinion for International (PCT) Patent Application No. PCT/US2011/052811, mailed Apr. 27, 2012 14 pages.
Official Action for U.S. Appl. No. 13/365,148, mailed Oct. 23, 2012 10 pages.
Notice of Allowance for U.S. Appl. No. 13/247,817, mailed Sep. 11, 2013 12 pages.
Official Action for U.S. Appl. No. 13/222,888, mailed Sep. 6, 2013 19 pages.
Official Action for U.S. Appl. No. 13/365,157, mailed Aug. 15, 2013 19 pages.
Official Action for U.S. Appl. No. 13/365,153, mailed Aug. 16, 2013 18 pages.
"Basics Guide Kyocera Echo," Sprint Corporation, Jun. 22, 2011, accessed Nov. 27, 2013 [web.archive.org/web/20110622191751/http://support.sprint.com/support/device/Kyocera/Kyocera_Echotrade-dvc4820001prd] 161 pages.
Official Action for U.S. Appl. No. 13/247,359, mailed Nov. 21, 2013 11 pages.
Official Action for U.S. Appl. No. 13/247,787, mailed Nov. 15, 2013 18 pages.
Official Action for U.S. Appl. No. 13/247,823, mailed Oct. 11, 2013 19 pages.
Official Action for U.S. Appl. No. 13/247,514, mailed Oct. 11, 2013 16 pages.
Official Action for U.S. Appl. No. 13/248,199, mailed Oct. 1, 2013 16 pages.
Official Action for U.S. Appl. No. 13/248,199, mailed Dec. 23, 2013 16 pages.
Official Action for U.S. Appl. No. 13/341,634, mailed Nov. 19, 2013 23 pages.
Official Action for U.S. Appl. No. 13/341,666, mailed Dec. 17, 2013 25 pages.
Official Action for U.S. Appl. No. 13/222,888, mailed Jan. 6, 2014 13 pages.
"Make Windows Position Your Dual Monitors Correctly," How-To Geek.com, Apr. 17, 2010, [retrieved on Mar. 4, 2014], 4 pages. Retrieved from: vvvvw.howtogeek.com/howto/14875/make-windows-position-your-dual-monitors-correctly/.
Official Action for U.S. Appl. No. 13/247,359 mailed Mar. 21, 2014 12 pages.
Official Action for U.S. Appl. No. 13/247,823 mailed Mar. 12, 2014 19 pages.
Official Action for U.S. Appl. No. 13/247,728 mailed Jan. 31, 2014, 17 pages.
Official Action for U.S. Appl. No. 13/365,157, mailed Jan. 21, 2014, 21 pages.
Official Action for U.S. Appl. No. 13/365,153, mailed Jan. 16, 2014, 17 pages.

\* cited by examiner

MULTI-SCREEN USER INTERFACE WITH ORIENTATION BASED CONTROL

RELATED APPLICATIONS

This application claims priority to U.S. Provisional Application Ser. No. 61/389,000, filed Oct. 1, 2010, entitled "DUAL DISPLAY WINDOWING SYSTEM"; Provisional Application Ser. No. 61/389,117, filed Oct. 1, 2010, entitled "MULTI-OPERATING SYSTEM PORTABLE DOCKETING DEVICE"; and Provisional Application Ser. No. 61/389,087, filed Oct. 1, 2010, entitled "TABLET COMPUTING USER INTERFACE". Each and every part of the foregoing provisional applications is hereby incorporated by reference in their entirety.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect includes a method of controlling a plurality of displays of a handheld computing device. The method includes disposing the handheld computing device in a first orientation. When the device is in the first orientation, a first screen is displayed on a first display of the plurality of displays. The method further includes positioning the handheld computing device in a second orientation different than the first orientation by moving the handheld computing device from the first orientation in a first direction and modifying the plurality of displays such that the first application is displayed on the first display and a second display of the plurality of displays in response to the positioning.

A second aspect includes a handheld computing device. The device includes a processor. Additionally, the device includes a first display in operative communication with the processor. The first display is operable to display a first application screen. Also, the device includes a second display in operative communication with the processor. The second display is operable to display a second application screen different than the first application screen. The device also includes an accelerometer in operative communication with the processor that is also operable to resolve the orientation of the handheld computing device to determine if the handheld computing device is in one of a plurality of orientations. In turn, the content of the first display and the second display is controllable by the processor in response to the orientation of the handheld computing device as determined by the accelerometer.

A third aspect includes a method of controlling a plurality of displays of a handheld computing device. The method includes disposing the handheld computing device in a first orientation. The method further includes positioning the handheld computing device in a second orientation such that a first display of the plurality of displays is in a dominant display position and a second display of the plurality of displays is in a subservient display position When the handheld computing device is in the second orientation. The method also includes sensing the change in orientation of the hand held computing device to the second orientation and modifying the plurality of displays such that a first application displayed on the first display When the handheld computing device is in the first orientation is displayed on at least the first display and a second display in response to the change in orientation to the second orientation.

A number of feature refinements and additional features are applicable to the foregoing aspects. These feature refinements and additional features may be used individually or in any combination. As such, each of the following features that will be discussed may be, but are not required to be, used with any other feature or combination of features of any of the aspects presented herein.

In one embodiment, the first orientation may be a portrait orientation and the second orientation may be a landscape orientation. The method may include sensing the positioning using an accelerometer.

In another embodiment, the method may also include locating the handheld computing device in a third orientation different than the first orientation and the second orientation by moving the hand held computing device from the first orientation in a second direction opposite the first direction. In turn, the first application may be maintained in the first display and no change may occur to the contents of the second display upon the locating of the handheld computing device in the third orientation.

The movement of the handheld computing devices between any of the first orientation, the second orientation, and the third orientation may include angular movement of the handheld computing device. For example, the first direction may include clockwise rotation of the handheld computing device and the second direction may include clockwise rotation of the handheld computing device.

In yet another embodiment, the method may also include displaying a second screen associated with a second application on the second display when the handheld computing device is in the first orientation. The method may also include locating the handheld computing device in a third orientation different than the first orientation and the second orientation by moving the hand held computing device from the first orientation in a second direction opposite the first direction and changing the plurality of displays such that the first application is displayed on the first display and the second display of the plurality of displays in response to the locating.

In any of the foregoing embodiments, movement in the first direction may result in the first display being positioned above the second display with respect to gravity in the second orientation. In contrast, movement in the second direction may result in the second display being positioned above the first display with respect to gravity in the second orientation.

In one embodiment, one of the first application and the second application comprise a hierarchical application sequence. In this regard, both applications may be hierarchical application sequences. The method may also include receiving a gesture input at the handheld computing device when the handheld computing device is in one of the second orientation and the third orientation and altering the first display or second display to display a different one of the first application and the second application in response to the receiving. The gesture input may be directional and the altering may be dependent upon the direction of the gesture input.

In another embodiment, a dominant display position may be above a subservient display position With respect to gravity. The method may further include locating the device in a third orientation such that the second display of the plurality of displays is in a dominant display position and the first display of the plurality of displays is in a subservient display position When the handheld computing device is in the third orientation. This change in orientation may be sensed such that the method further includes modifying the plurality of displays such that a second application screen displayed on the second display When in the first orientation is expanded to be displayed in at least the first display and the second display in response to the change in orientation or the handheld computing device to the third orientation.

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
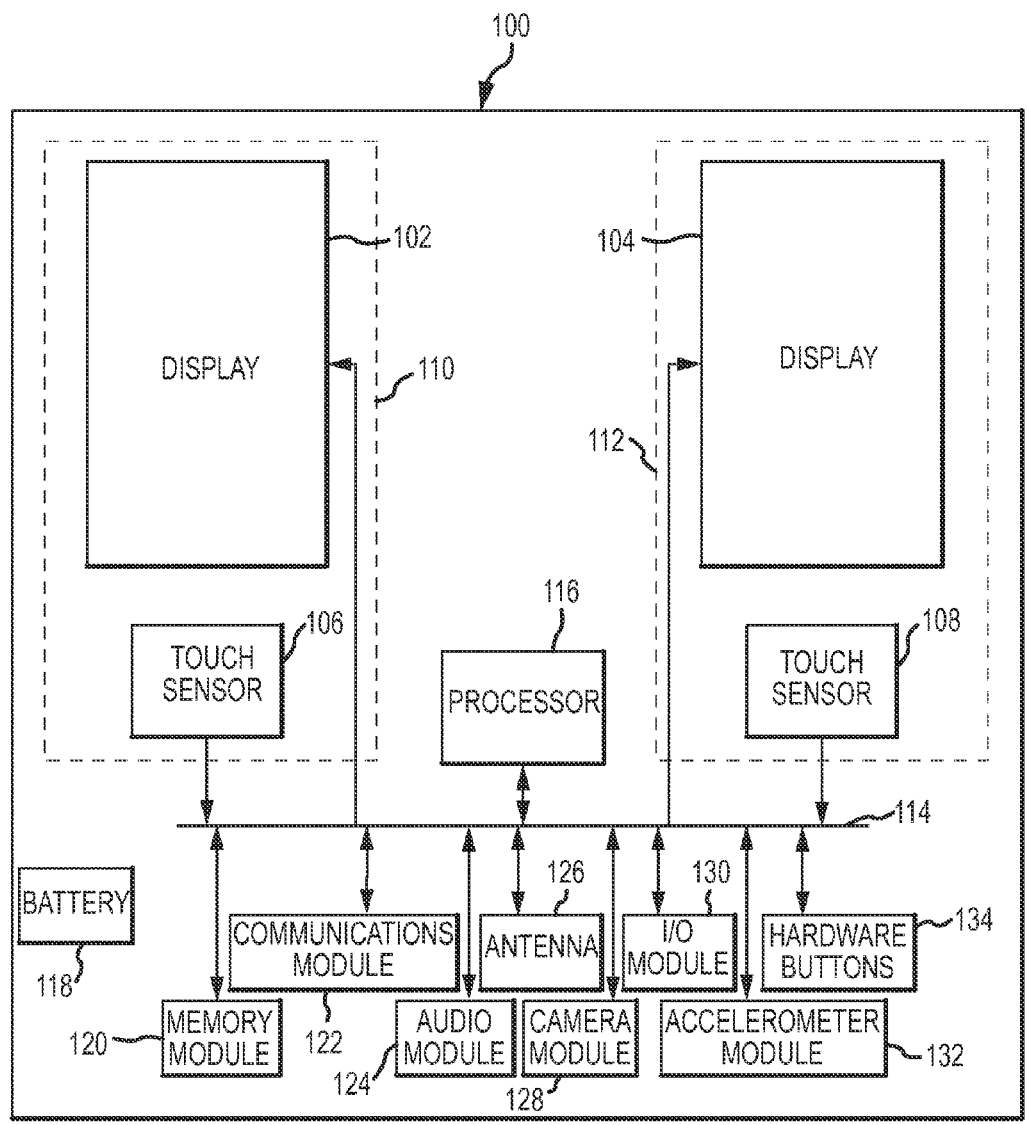
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes more than two displays. In any regard, the first display 102 and the second display 104 may be independently controllable. The displays may be operative to display a displayed image or "screen". As used herein, the term "display" is intended to connote device hardware, whereas "screen" is intended to connote the displayed image produced on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single touch sensor may be provided that allows for inputs to control both the first display 102 and the second display 104. The single touch sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

Figure 12A:
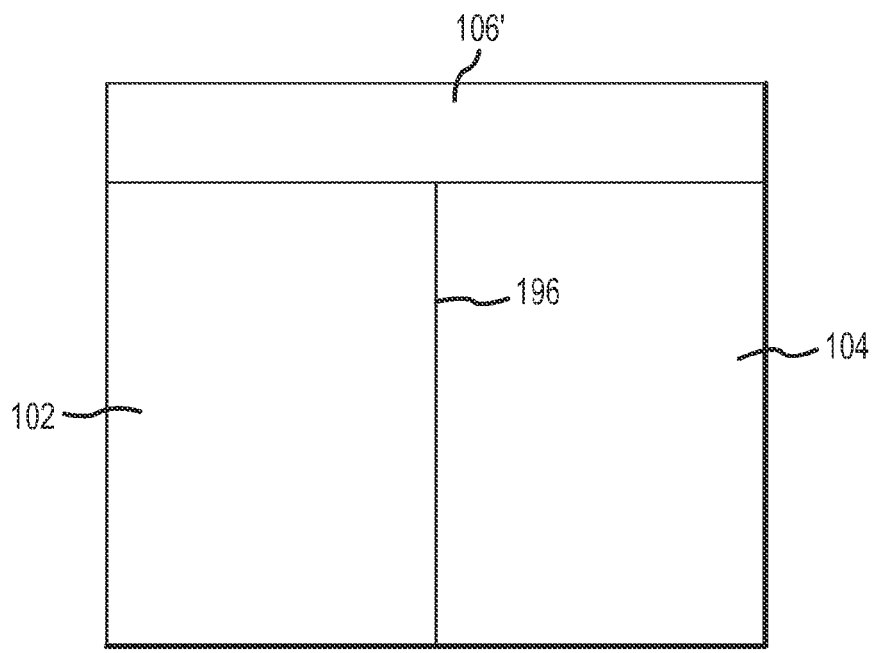
FIGS. 12A and 12B are schematic views of two embodiments of a handheld computing device provided with touch sensitive devices.
Figure 12B:
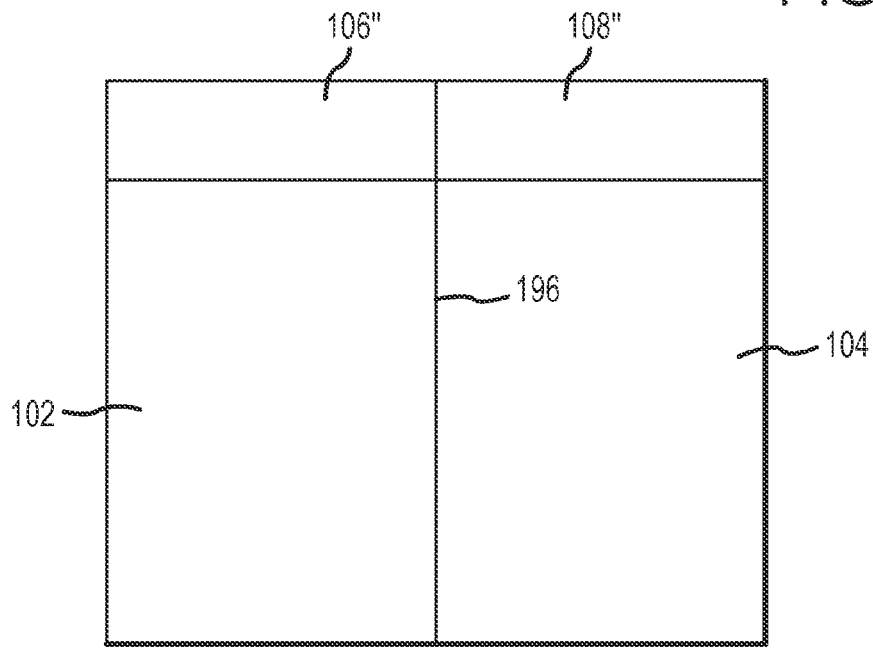

With reference to FIGS. 12A and 12B, various potential arrangements are depicted for the first display 102, the second display 104, and touch sensors 106', 106", and 108". In FIG. 12A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 9B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 12A and 12B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components via the data bus 114. Furthermore, while the discussion below may describe the additional components 120-134 being in operative communication with the data bus 114, in other embodiments any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108. The processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, volume control, a home screen button, an end button, a send button, a menu button, etc.

With further reference to FIGS. 2A-D, various screens of an embodiment of a device are shown. multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
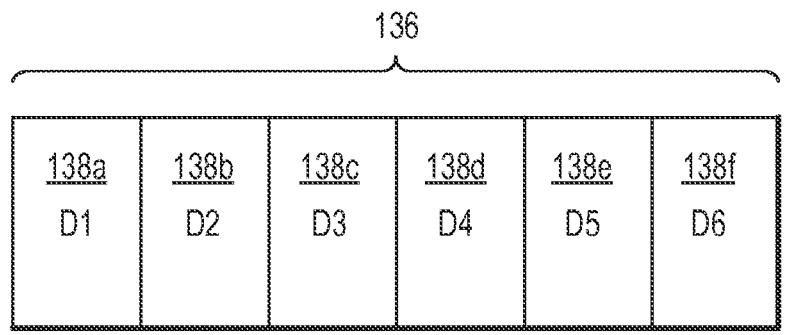
FIGS. 2A-D are graphical representations of an embodiment of a handheld computing device in various instances of operation.

A desktop sequence 136 is displayed in FIG. 2A. The desktop sequence 136 may include a number of individual desktop screens 138a-138f. Thus, each desktop screen 138 may occupy substantially the entirety of a single display (e.g., the first display 102 or second display 104 of FIG. 1). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 2B:
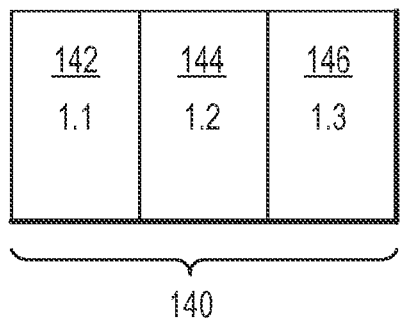
Figure 2C:
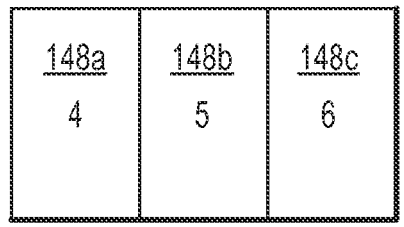

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen for which the leaf screen 146 is a parent. As such, the leaf screen does not have any children node screens 144. FIG. 2C depicts various single screen applications 148a, 148b, and 148c arranged sequentially. Each of these single screen applications may correspond to a different executing application. For instance, in FIG. 2C Application 4, Application 5, and Application 6 may be executing on the device and correspond to each single screen 148a, 148b, and 148c, respectively.

Figure 2D:
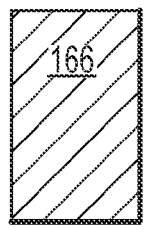

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). While shown in FIG. 2D as a grayed screen, an empty view 166 is only intended to refer to a screen not capable of receiving an input (e.g., a screen in transition). In this regard, the display of an empty view 166 may include an animation or the like showing the response of a screen as it is being moved or changed (e.g., modified into or out of a landscape mode).

Figure 3A:
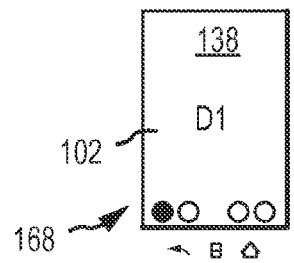
FIGS. 3A-K are graphical representations of an embodiment of a handheld computing device provided in different positions, orientations, and instances of operation.
Figure 3B:
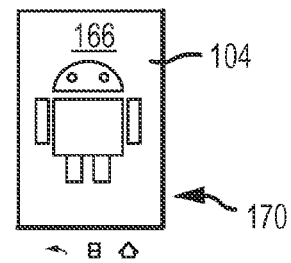

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 or may simply display an empty view 166 (e.g., displaying an icon or other graphic) and lack functionality as an interface.

Figure 3C:
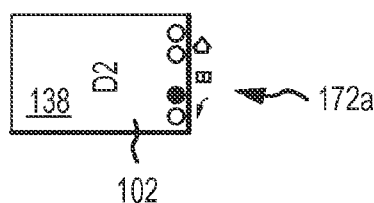
Figure 3D:
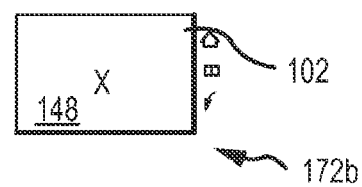

FIG. 3C depicts a closed device in a landscape orientation 172a. In one embodiment, a landscape mode (i.e., wherein the display is adjusted to display a screen 148 in a landscape orientation) may not be enabled as shown in FIG. 3C. Alternatively, the landscape mode may be enabled such that the screen 148 is modified when the device is sensed in a landscape orientation 172b, such that the screen 148 is rendered in a landscape orientation as shown at FIG. 3D.

Figure 3E:
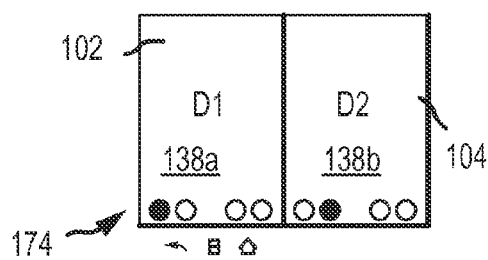

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138a, 138b, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Figure 3F:
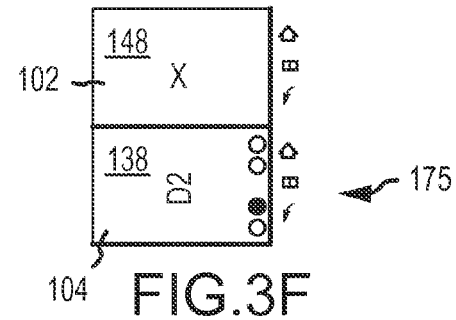
Figure 3G:
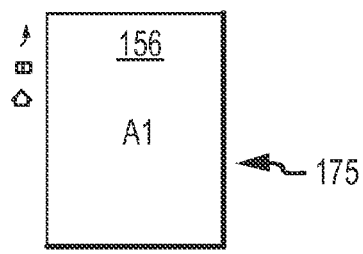
Figure 3H:
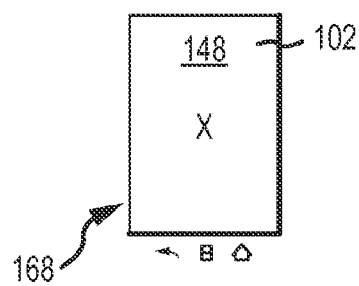

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation 172 may display a multi screen GUI 156 that may occupy both displays 102, 104 in a portrait orientation as shown in FIG. 3G such that the individual displays are in a landscape orientation.

Figure 3I:
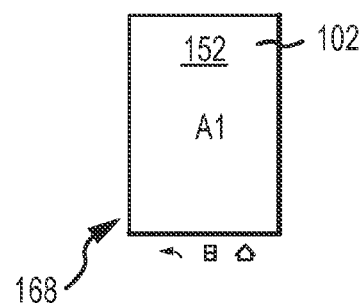
Figure 3J:
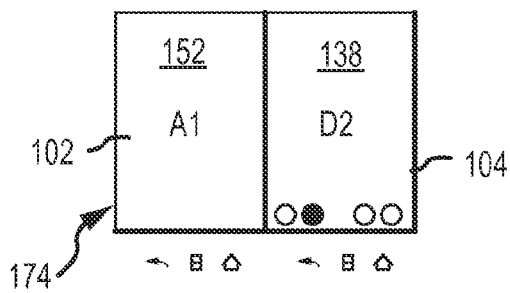
Figure 3K:
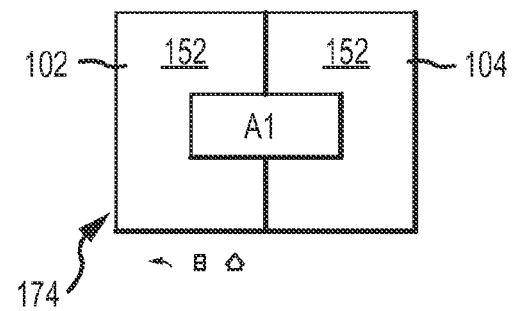

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
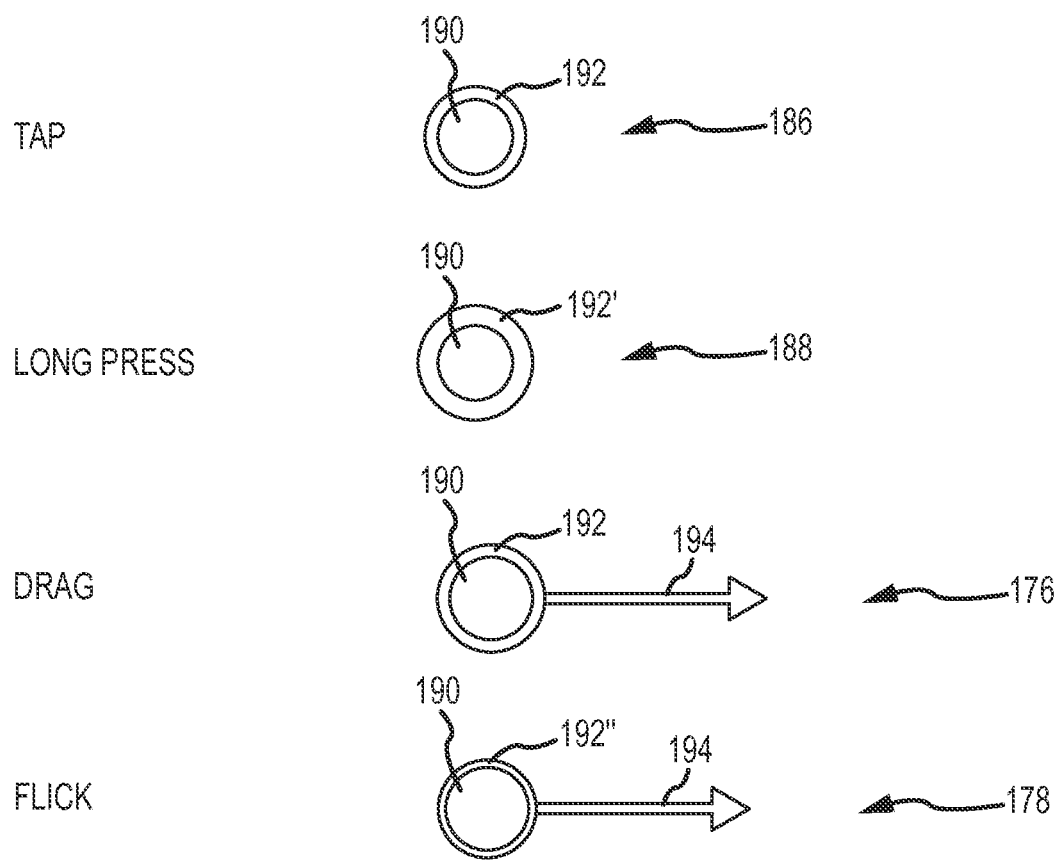
FIG. 4 includes graphical representations of various gesture inputs for controlling a handheld computing device.

FIG. 4 depicts various graphical representations of gesture inputs that may be recognized by a handheld computing device. Such gestures may be received at one or more touch sensitive portions of the device. In this regard, various input mechanisms may be used in order to generate the gestures shown in FIG. 4. For example a stylus, a user's finger(s), or other devices may be used to activate the touch sensitive device in order to receive the gestures. The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. In this regard, the long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

In an embodiment, a gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered.

Figure 13:
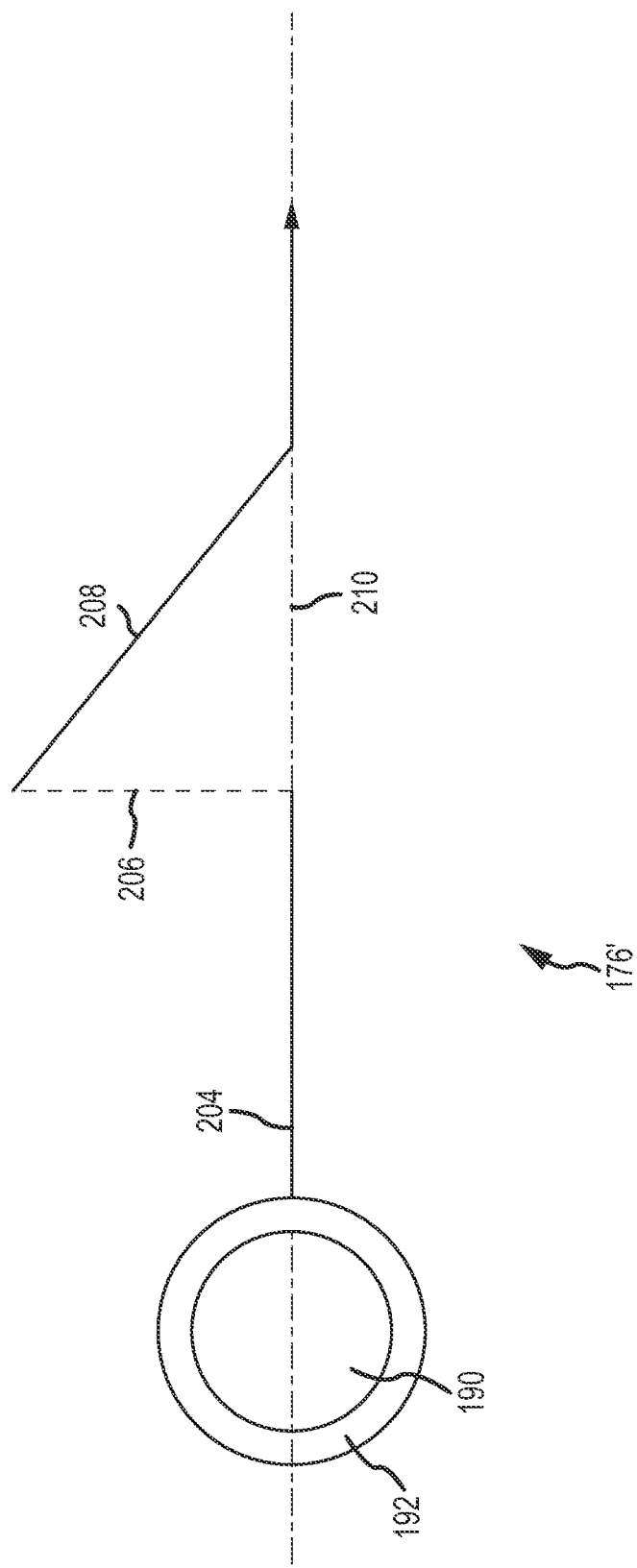
FIG. 13 is a graphical representation of an embodiment of a gesture input.

While the directional gestures (e.g., the drag 176 and flick 178) shown in FIG. 4 include only horizontal motion after the initial touch, this may not be actual movement of the touch during the gesture. For instance, once the drag is initiated in the horizontal direction, movement in a direction other than in the horizontal direction may not result in movement of the screen to be moved in the direction different and the horizontal direction. For instance, with further reference to FIG. 13, the drag 176 from left to right may be initiated with initial movement 204 from left to right along an initiated direction 210. Subsequently, while maintaining contact with the touch sensitive device, the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

Figure 5A:
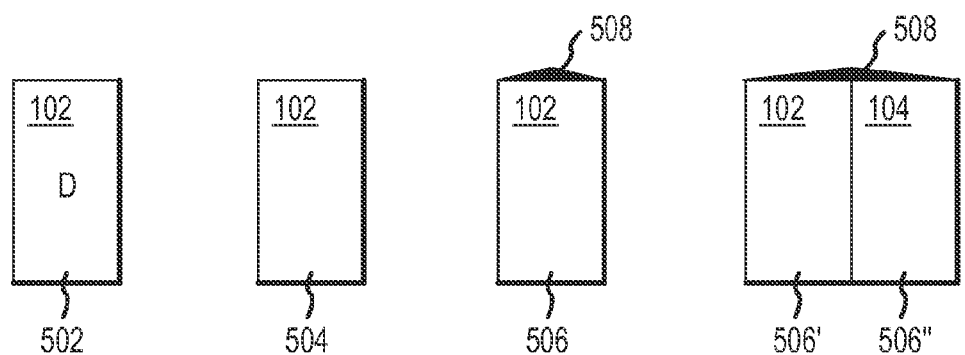
FIGS. 5A and 5B include graphical representations of an embodiment of a handheld computing device wherein different types of screens are displayed by the handheld computing device.
Figure 5B:
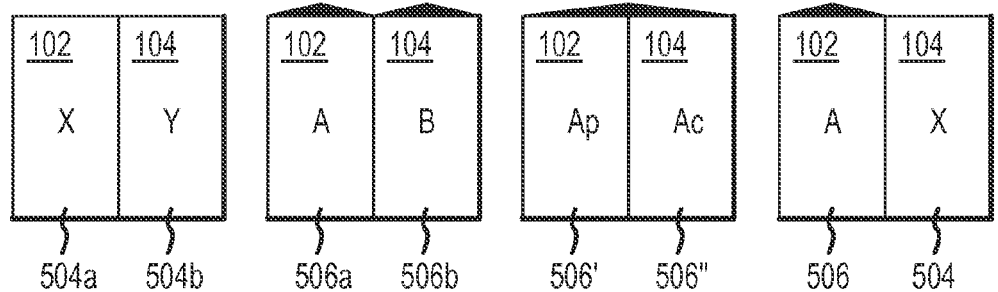

Another embodiment of a handheld computing device operable to execute and display a number of different applications is shown in FIGS. 5A and 5B. FIG. 5A depicts a first display 102 displaying a desktop screen 502. Alternatively, the first display 102 may display a single screen application 504. Further still, the first display 102 may display a multi-screen application 506 operating in single screen mode. Also shown in FIG. 5A, the first display 102 and the second display 104 may be operative to display a multi-screen application 506 such that a first screen 506' is displayed in the first display 102 and a second screen 506" is display in the second display 104. When displaying a multi-screen application 506 in the figures described herein, an expansion indicator 508 may be provided to indicate that the multi-screen application 506 may be expanded or is in an expanded mode as shown in FIG. 5A. In this regard, the expansion indicator 508 may not actually be provided on the device, but provided in the figures herein as an indication that an application may be expanded or is expanded to be displayed one or more displays.

FIG. 5B depicts potential arrangements of a handheld computing device having at least two displays operable to display several different types and arrangements of screens when at least two displays of the device are concurrently visible. For instance, the first display 102 may include a first screen 504a and the second display 104 may include a second screen 504b. Alternatively, the first display 102 may display a first multi screen application 506a operating in single screen mode and a second display 104 may display a second multi-screen application 506b executing in single screen mode. Further still, the multi screen application 506 may be a hierarchical application such that the first screen 506' of the multi screen application 506 in the first display 102 is a parent screen and the second screen 506" of the multi screen application 506 in the second display 104 is a child screen. Further still, the first display 102 may be operative to display a multi-screen application 506 operating in single screen mode while the second display 104 displays a single screen 504. Other combinations of the foregoing may be realized without limitation and may also include the display of a desktop screen 502 in combination with any other type of screen.

Figure 6A:
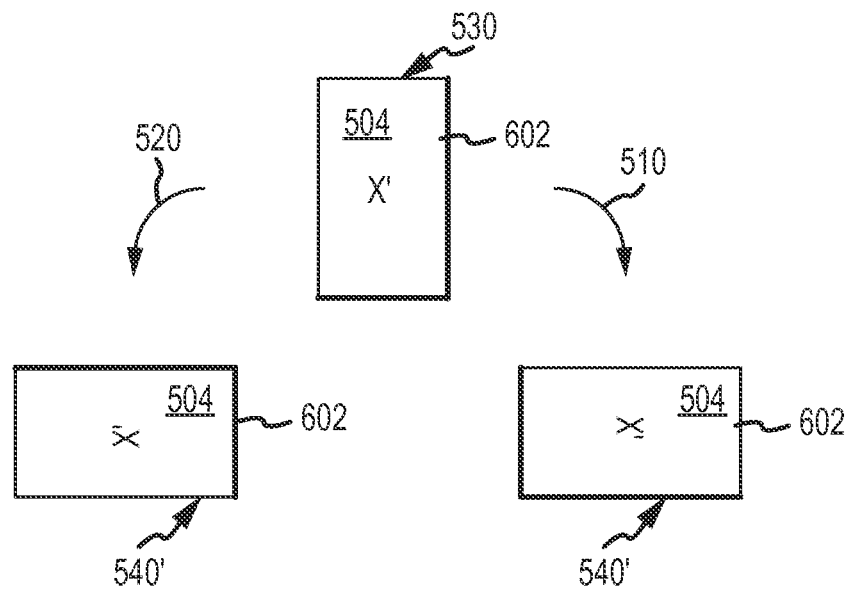
FIGS. 6A and 6B are graphical representations of embodiments of a handheld computing device functioning in response to a change in orientation.
Figure 6B:
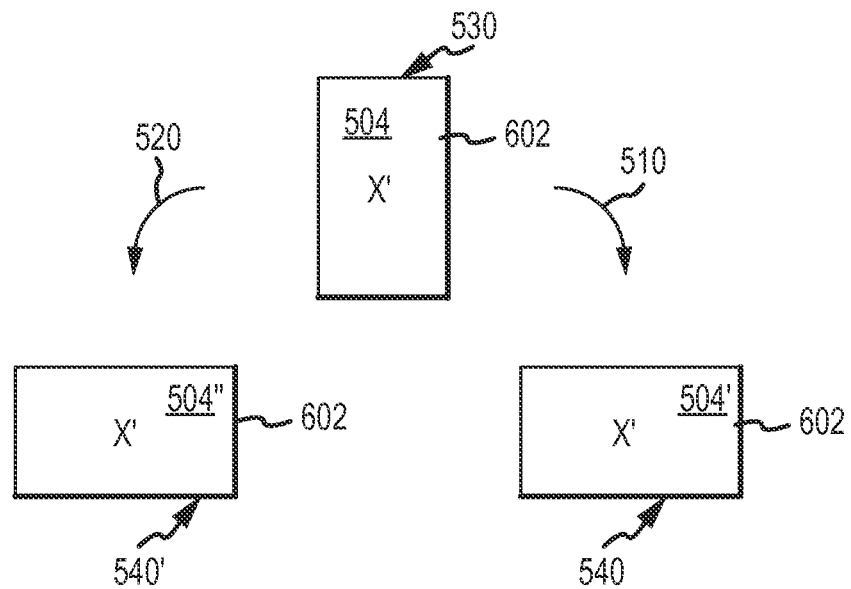

FIGS. 6A and 6B depict a display 602 of handheld computing device being changed from a portrait orientation 530 into a first landscape orientation 540 and a second landscape orientation 540'. As can be seen in FIG. 6A, the display 602 may be operable to display an application screen 504. Alternatively, a desktop screen, a multi screen application operating in a single screen mode, or other screen variants may be displayed and may have similar functionality as that described below. As shown in FIG. 6A, the handheld computing device may be moved in a first direction 510 (e.g., corresponding with a clockwise angular movement of the handheld computing device) such that the handheld computing device is oriented in a first landscape orientation 540. In this regard, the application screen 504 may be maintained in a portrait mode (e.g., the application screen 504 may not change in response to the movement in the first direction 510). Alternatively, as shown in FIG. 6B, the application screen 504 may change in response to the change in orientation of the handheld computing device from the portrait orientation 530 to the first landscape orientation 540. In this regard, a modified application screen 504' may be displayed corresponding to a landscape mode of the application screen 504. Whether or not an application screen 504 changes to and from the modified application screen 504' in response to the change in orientation between the portrait orientation 530 and the first landscape orientation 540 may depend on the type of application screen 504, a configuration value related to whether the application screen may be displayed in landscape mode, or some other appropriate measure of control related to the change in the application screen 504.

Additionally, display 602 may be moved in a second direction 520 (e.g., in a counterclockwise direction) such that the display 602 is oriented in a second landscape orientation 540'. As shown in FIG. 6A, the application screen 504 may not change in response to movement in the second direction 520 such that the application screen 504 is not modified when the handheld computing device is in the second landscape orientation 540'. As shown in FIG. 6B, the movement of the handheld computing device in the second direction 520 such that the device is in the second landscape orientation 540' may result in the application screen 504 being modified such that a modified application screen 504" corresponding to a landscape mode of the application screen 504 is displayed when the device is in the second landscape orientation 540'.

In this regard, movement in a first direction 510 and the movement in a second direction 520 may result in modification of the application screen 504 into modified application screen 504' or 504", depending upon the direction of the movement or the resultant position of the display. That is, the modified application screens 504' and 504" may appear to a user in a similar manner, however the two screens 504' and 504" may be oriented differently with respect to the device in a manner corresponding to the direction which the handheld computing device was moved from the portrait orientation 530 to the landscape orientation 540.

Figure 7A:
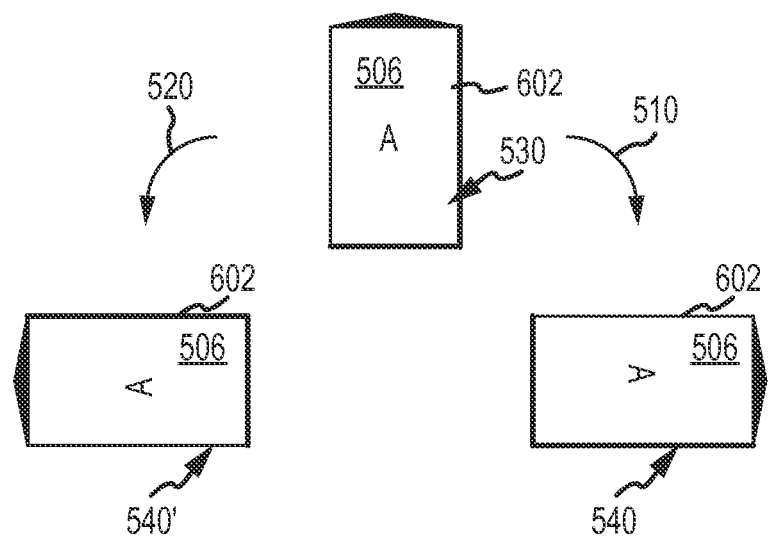
FIGS. 7A and 7B are graphical representations of other embodiments of a handheld computing device functioning in response to a change in orientation.
Figure 7B:
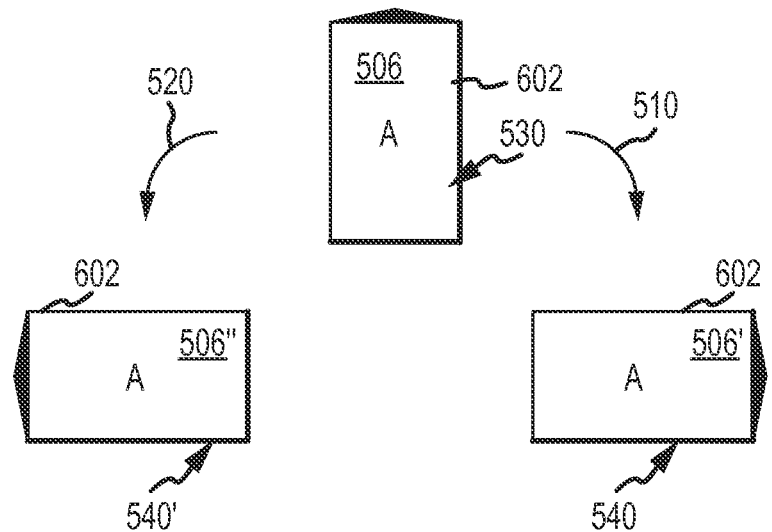

Turning to FIGS. 7A and 7B, a display 602 of a handheld computing device may display a multi screen application 506 operating in a single screen mode. The display 602 may be moved in a first direction 510 or a second direction 520 such that the display 602 is positioned in a first landscape orientation 540 or a second landscape orientation 540', respectively. In one embodiment shown in FIG. 7A, positioning the handheld computing device in the first landscape orientation 540 or the second landscape orientation 540' does not result in a change to the multi screen application 506. In another embodiment, shown in FIG. 7B, the multi screen application 506 may be modified such that the display 602 displays a modified application screen 506' or 506". The modified application screens 506' and 506" correspond to the application screen 506 operating in landscape mode such that the modified application screens 506' and 506" are appropriately arranged based upon whether the handheld computing device is in the first landscape orientation 540 or the second landscape orientation 540'.

Figure 8:
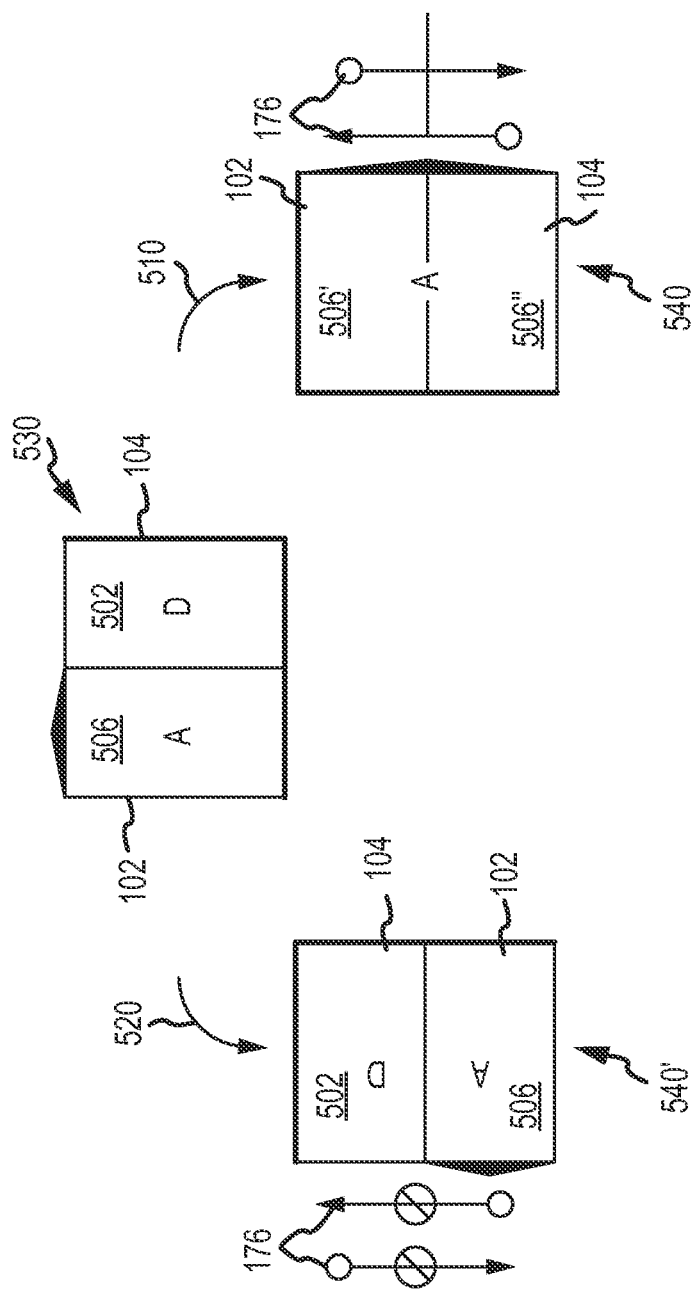
FIG. 8 is a graphical representation of an embodiment of a handheld computing device including at least two displays functioning in response to a change in orientation.

FIG. 8 depicts the functioning of the displays 102, 104 of a handheld computing device when changed from a portrait orientation 530 to a first landscape orientation 540 and a second landscape orientation 540' when the device is arranged such that at least two displays 102 and 104 are visible by a user. Depending upon the direction of the movement (e.g., the first direction 510 or the second direction 520) of the handheld computing device may be positioned into one of at least two landscape orientations. For instance, movement in the first direction 510 may result in the handheld computing device being arranged in the first landscape orientation 540, whereas movement in the second direction 520 may result in the handheld computing device being arranged in the second landscape orientation 540'. The different movements (e.g., in the first direction 510 or the second direction 520) may result in different orientations of the device. For instance, a first display 102 may be positioned differently with respect to the second display 104 based on the direction in which the device is moved.

When the device is in the portrait orientation 530, the device, in one example, may display a multi-screen application 506 operating in single screen mode in the first display 102. The second display 104 may display a desktop screen 502 or some other type of single screen. When rotated in the second direction 520, the result may simply be a change in orientation to the second landscape mode 540' such that the status of the displays (that is, which applications are displayed and in which display) is maintained. In this regard, the first display 102 (which has become the bottom display) may still display the multi-screen application 506 executing in single screen mode. The second display 104 may still display the desktop screen 502. Gesture inputs (e.g., drag gestures 176) received when in the landscape orientation 540 may not have a functionality associated therewith. That is, the gestures may be ignored or not result in movement of the screens 502, 506 between the displays 102, 104. The multi-screen application 506 operating in single screen mode may be maintained in a portrait mode (as shown) or may be adjusted to be displayed in a landscape mode while still occupying only the first display 102. Similarly, the desktop screen 502 may be adjusted to be displayed in a landscape mode or maintained in a portrait mode as described above.

In FIG. 8 when the handheld computing device is moved from the portrait orientation 530 to the first landscape orientation 540 by way of movement in the first direction 510, the first display 102 may be changed such that it is in a top display position and the second display 104 may be changed such that it is in a bottom display position. "Top" and "bottom" may be used refer to the position of the displays with respect to gravity. "Top" and "bottom" may also refer to the positioning of the displays from the perspective of a user, which may be the same relative position as with respect to gravity or may be different. Additionally, the top display position may be defined as a dominant display position. By dominant display position, it is meant that a screen displayed on the display in the dominant display position may be expanded if the screen is expandable. For instance, a screen displayed on a display in a dominant display position may be expanded into a display in a subservient display position. The dominant display position and subservient display position may be definable such that the top display position, the bottom display position, or some other display position may be defined as the dominant display position or the subservient display position.

Accordingly, movement of the device in the first direction 510 into the first landscape orientation 510 as shown in FIG. 8 may result in the multi-screen application 506 which was operating in single screen mode when in the portrait orientation 530 changing such that it executes in a dual screen mode. This may correspond to the motion in the first direction 510 resulting in the first display 102 being positioned above the second display 104 such that the first display comes to occupy the dominant display position. As such, if the application executing in the first display 102 when in the portrait mode 530 is capable of being expanded to occupy more than one display, upon a change in orientation of the device such that the first display is in the dominant display position, the screen of the multi screen application 506 in the first display may be expanded into the display in the subservient display position (e.g., the second display 104 as shown in FIG. 8). As such, when the device is in the first landscape orientation, the multiscreen application 506 may be expanded such that the first display 102 displays a first screen 506' of the multiscreen application 506 and the second display 104 displays the second screen 506" of the multi-screen application 506. When in the multi-screen mode, gestures (e.g., drags 176) received may perform functionality associated with the multiscreen application 506 as described above.

In an embodiment where the dominant display position and subservient display positions are defined with respect to gravity, the orientation of the device may be determined by the use of an accelerometer module as described above with reference to FIG. 1. The accelerometer module may be operative to determine the orientation of the device and resolve which of a plurality of displays is the upper most display with respect to gravity. This display may in turn be defined as being in the dominant display position. Accordingly, a screen that is capable of being expanded is in fact expanded upon movement of the device such that the display in which the screen is displayed is in the dominant display position. When the dominant display position is defined as the upper most display with respect to gravity, the functionality regarding the expansion of the screen may be intuitive to a user. In this regard, upon movement of the device such that a display is in the upper most display with respect to gravity may result in an effect recognized by the user as the screens of the multi screen application falling under the action of gravity into the second display in the subservient display position. If the screen occupying the dominant display is not capable of expansion, it may appear to a user as if there is nothing to be urged by gravity into the second display. This functionality of the screens may mimic the action of physical panels or cards being influenced by gravity. This may create an intuitive user interface whereby a user may control the expansion of screens into other displays in a manner that comports with the user's notions regarding the action of gravity with regard to the screens.

Figure 9:
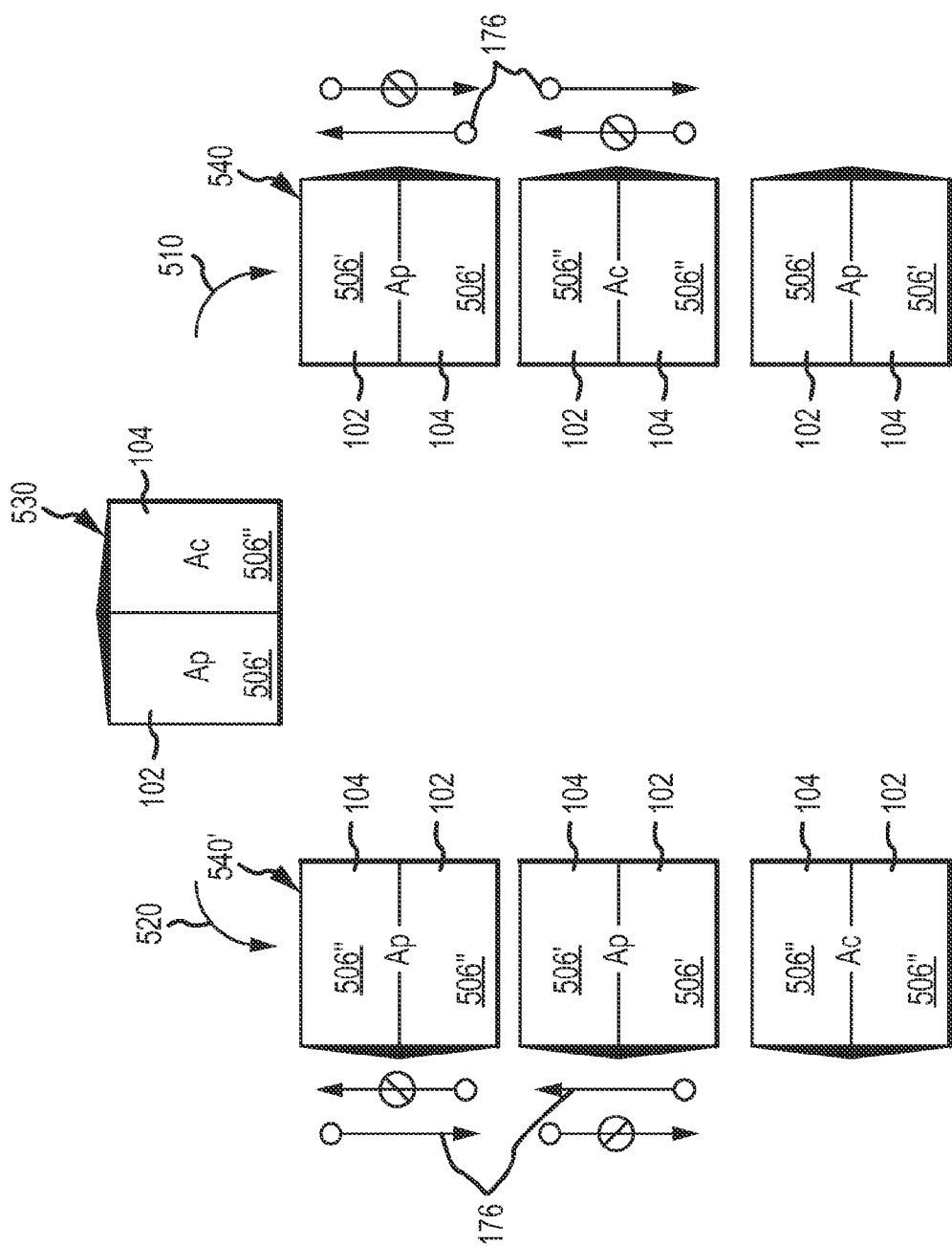
FIG. 9 is a graphical representation of another embodiment of a handheld computing device including at least two displays functioning in response to a change in orientation and gesture inputs.

Another embodiment of the movement of the handheld computing device from a portrait orientation 530 to a first landscape orientation 540 and/or a second landscape orientation 540' such that an application executing in a display positioned in a dominant display position is expanded across both displays is shown in FIG. 9. In FIG. 9, when in the portrait orientation 530, the device may be executing such that a parent screen 506' of a multi-screen application 506 is displayed in a first display 102 and a child screen 506" of a multi-screen application 506 is displayed in the second display 104. Either the parent screen 506' or the child screen 506" may further be expandable to occupy both displays. In this regard, as described above, the expansion of either the parent screen 506' or the child screen 506" may result in the expansion of either of the screens to occupy both displays. Additionally, the expansion of either the parent screen 506' or the child screen 506" may be dependent upon which display is positioned in a dominant display position when the handheld computing device is changed from a portrait orientation 530 to one of the first landscape orientation 540 and the second landscape orientation 540'. For instance, when the handheld computing device is changed from portrait orientation 530 to a first landscape orientation 540 by way of movement in the first direction 510, the first display 102 may be in a dominant display position with respect to the second display 104. This may correspond to the situation wherein the first display 102 is positioned above the second display 104 (e.g., such that the first display 102 is the upper most display with respect to gravity). As such, the parent screen 506', which was displayed in the first display 102 when in the portrait orientation 530 may be expanded to occupy both the first display 102 and the second display 104.

In contrast, if the handheld computing device is moved from a portrait orientation 530 to the second landscape orientation 540' by way of movement in the second direction 520, the second display 104 may be in the dominant display position and the first display 102 may be in the subservient display position by way of the fact that the second display 104 is positioned above the first display 102 with respect to gravity when moved in the second direction 520. As such, the child screen 506" may be expanded to occupy both displays when the device is moved in the second direction 520.

Furthermore, once the device is oriented in either the first landscape orientation 540 or the second landscape orientation 540', a gesture input 176 may be received to move between the parent screen and child screen being displayed on both the first display 102 and the second display 104. In this regard, when moved in the first direction 510 to the first landscape orientation 540, the parent screen 506' may be expanded such that it occupies both the first display 102 and the second display 104. An upward drag gesture 176 received at the device may result in a change such that the child screen 506" is displayed in both displays. For instance, the direction of the drag gesture 176 may correspond to the perceived location of the child screen 506" after expansion of the parent screen 506' to both displays. That is, when expanding the parent screen 506' to occupy both displays 102 and 104, it may appear to the user that the child screen 506" is forced off the subservient display by the expanding parent screen 506'. As such, it may be perceived by the user that the child screen 506" is positioned below the second display 104, even though the child screen 506" is no longer visible to the user. Accordingly, an upward drag gesture 176 may be intuitive to a user because when the device is moved from the portrait orientation 530 to the first landscape orientation 540, the parent screen 506' may be expanded across both displays such that it appears that a child screen 506 is pushed off display to be below the parent screen 506' when in the landscape orientation 540 by way of the first direction 510. Thus, an upward drag gesture 176 may result in the movement of the child screen 506' such that it occupies both displays 102, 104. A subsequent downward drag gesture 176 when the child screen 506' is occupying both the first display 102 and the second display 104 may result in movement of to the parent screen 506' such that it is displayed on both displays 102 and 104. A drag gesture in an opposite direction of those disclosed above may be ignored or not result in any movement of the screens.

When the device is moved into the second landscape orientation 540' by way of movement in the second direction 520, it may appear to the user that the child screen 506" pushes the parent screen 506' below the viewable area by virtue of expansion of the child screen 506" from the dominant display 104 into the subservient display 102. Thus, the downward gesture input 176 may result in the parent screen 506' being displayed on both displays 102 and 104. A subsequent upward drag gesture 176 may again show the child screen 506" in the first display 102 and the second display 104. Gestures in a direction opposite of the foregoing may be ignored or not result in any movement of the screens.

Figure 10:
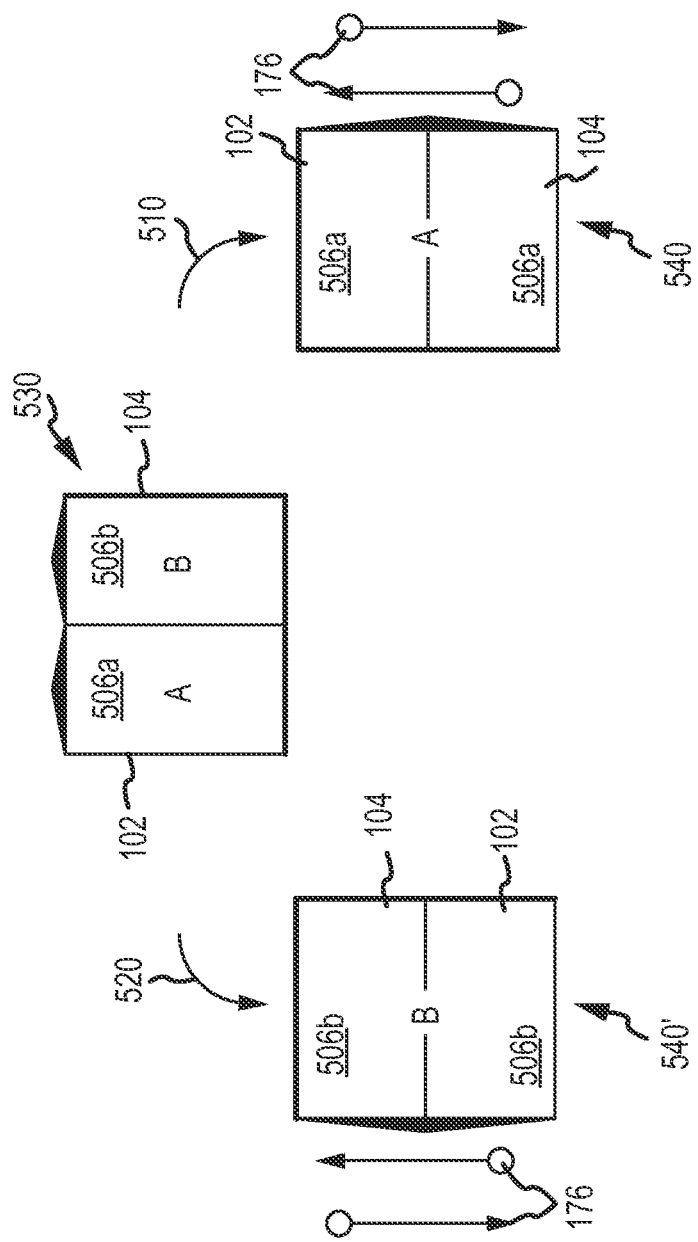
FIG. 10 is a graphical representation of yet another embodiment of a handheld computing device including at least two displays functioning in response to a change in orientation and gesture inputs.

In FIG. 10, the functionality of a device having multiple displays 102 and 104 is shown when changed between a portrait orientation 530 and a first landscape orientation 540 and/or a second landscape orientation 540'. When in the portrait orientation 530, a first multi-screen application 506a operating in single screen mode may be displayed in the first display 102. A second multi-screen application 506b executing in single screen mode may be displayed in the second display 104. Upon movement of the device in the first direction 510 to the first landscape orientation 540, the first display 102 may be positioned in a dominant position with respect to the second display 104. That is, the first display 102 may be positioned above the second display 104 with respect to gravity. This may result in the first multi-screen application 506a being expanded across both displays 102 and 104 by virtue of the first display 102 being positioned in a manner such that the first display 102 becomes the dominant display. Subsequent gesture inputs 176 may result in functionality associated with the first multi-screen application 506a. Movement of the device from the portrait orientation 530 into the second landscape orientation 540' by way of movement in the second direction 520 may result in the second display 104 being positioned in a dominant position with respect to the first display 102. As such, the second multi-screen application 506b executing in the second display 104 when the handheld computing device in the portrait orientation 530 may be expanded to occupy both the first display 102 and the second display 104 when the device is rotated into the second landscape orientation 540'. Gesture inputs 176 may be received and have functionality associated with the second multi-screen application 506b when executing in the landscape orientation 540 as shown.

Figure 11:
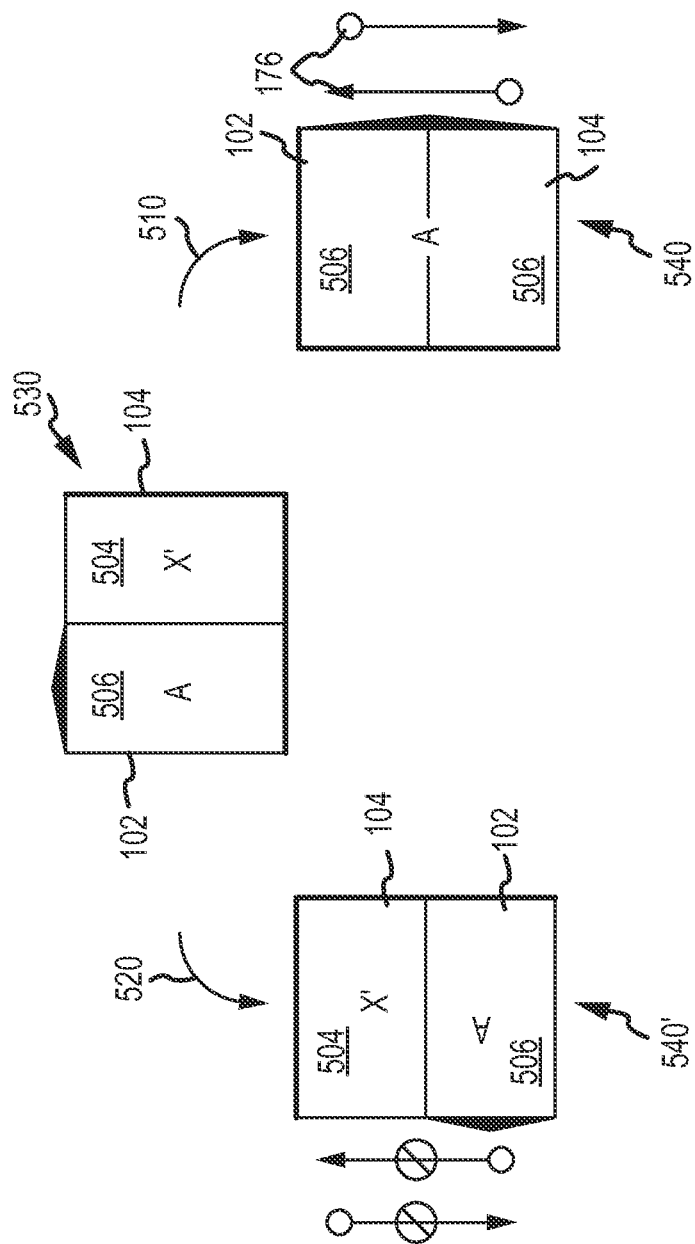
FIG. 11 is a graphical representation of another embodiment of a handheld computing device including at least two displays functioning in response to a change in orientation and gesture inputs.

Turning to FIG. 11, another embodiment of a handheld computing device functioning in response to a change in orientation from a portrait orientation 530 to a first landscape orientation 540 and or a second landscape orientation 540' is shown. When executing in the portrait orientation 530, a multi-screen application 506 may be executing in the first display 102. A single screen application 504 may be executing in the second display 104. Upon movement in the first direction 510 such that the device is positioned in the first landscape orientation 540, the first display 102 may be positioned in a dominant position with respect to the second display 104. Because the multi-screen application 506 executing in the first display 102 when in the portrait orientation 530 is capable of being expanded across multiple displays, the movement in the first direction 510 such that the display containing the multi-screen application 506 is in a dominant position may result in the expansion of the multi-screen application 506. Accordingly, the multi screen application 506 may occupy both the first display 102 and the second display 104. In contrast, when moved in the second direction 520 to the second landscape orientation 540, the second display 104 may be positioned in a dominant position when moved in the second direction 520. As the single screen application 504 executing in the second display 104 when in the portrait orientation 530 is not capable of being expanded to multiple screens, the movement of the device in the second direction 520 into the second landscape orientation 540 may not result in expansion of the single screen application 504. In this regard, the contents of the displays 104 and 102 may remain constant when moved in the second direction 520 or may be rotated to be displayed in landscape mode, without any expansion of either application.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method of controlling a plurality of displays of a handheld computing device, comprising:
   disposing the handheld computing device in a first orientation;
   displaying a first screen of a first application on a first display of the plurality of displays when the handheld computing device is in the first orientation;
   displaying one of a second screen of a second application or a desktop on a second display of the plurality of displays when the handheld computing device is in the first orientation;
   positioning the handheld computing device in a second orientation different than the first orientation by moving the handheld computing device from the first orientation in a first direction; and
   modifying the plurality of displays such that the first screen of the first application is displayed on the first display and the second display of the plurality of displays in response to the positioning.

2. The method according to claim 1, wherein the first orientation comprises a portrait orientation and the second orientation comprises a landscape orientation.

3. The method according to claim 2, further comprising sensing the positioning using an accelerometer.

4. The method according to claim 1, further comprising:
   positioning the handheld computing device in a third orientation different than the first orientation and the second orientation by moving the hand held computing device from the first orientation in a second direction opposite the first direction; and
   wherein the first application is maintained in the first display and no change occurs to the contents of the second display upon the positioning of the handheld computing device in the third orientation.

5. The method according to claim 4, wherein the movement of the handheld computing devices between any of the first orientation, the second orientation, and the third orientation comprises angular movement of the handheld computing device.

6. The method according to claim 5, wherein the first direction comprises clockwise rotation of the handheld computing device and the second direction comprises counter-clockwise rotation of the handheld computing device.

7. The method according to claim 1, further comprising:
   displaying a second screen associated with a second application on the second display when the handheld computing device is in the first orientation;
   positioning the handheld computing device in a third orientation different than the first orientation and the second orientation by moving the hand held computing device from the first orientation in a second direction opposite the first direction; and changing the plurality of displays such that the first application is displayed on the first display and the second display of the plurality of displays in response to the positioning.

8. The method according to claim 7, further comprising sensing the positioning using an accelerometer.

9. The method according to claim 7, wherein movement in the first direction results in the first display being positioned above the second display with respect to gravity in the second orientation.

10. The method according to claim 9, wherein movement in the second direction results in the second display being positioned above the first display with respect to gravity in the third orientation.

11. The method according to claim 10, wherein one of the first application and the second application comprise a hierarchical application sequence.

12. The method according to claim 7, further comprising:
receiving a gesture input at the handheld computing device when the handheld computing device is in one of the second orientation and the third orientation; and
altering one of the first display and second display to display a different one of the first application and the second application in response to the receiving.

13. The method according to claim 12, wherein the gesture input is directional and the altering is dependent upon the direction of the gesture input.

14. A handheld computing device, comprising:
a first display operable to display a first application screen;
a second display operable to display a second application screen different than the first application screen;
an accelerometer operable to resolve the orientation of the handheld computing device to determine if the handheld computing device is in one of a plurality of orientations;
a processor in operative communication with the first display, the second display, and the accelerometer, the processor operable to:
dispose the handheld computing device in a first orientation;
receive, from the accelerometer, a detection of a repositioning of the handheld computing device to a second orientation;
receive, from the accelerometer, a determination if whether the repositioning is in a first direction or a second direction;
modify the plurality of displays such that the first application screen is displayed on at least the first display and the second display if the handheld computing device is repositioned in the first direction; and
maintain the display of the first application screen on the first display and the second application screen on the second display when the handheld computing device is repositioned in the second direction.

15. A method of controlling a plurality of displays of a handheld computing device, comprising:
disposing the handheld computing device in a first orientation, wherein in a first orientation a first application screen is displayed on a first display and the second application screen, different than the first application screen, is displayed on a second display;
sensing a rotation of handheld computing device that changes the orientation of the handheld computing device;
determining if the rotation is in a first direction or a second direction;
if the rotation is in the first direction, positioning the handheld computing device in a second orientation, such that the first display of the plurality of displays is in a dominant display position and the second display of the plurality of displays is in a subservient display position; and
based on the positioning to the second orientation, modifying the plurality of displays such that a first application screen is displayed on at least the first display and the second display in response to the position in orientation to the second orientation.

16. The method according to claim 15, wherein a dominant display position is above a subservient display position with respect to gravity.

17. The method according to claim 16, further comprising:
if the rotation is in the second direction, positioning the device in a third orientation such that the second display of the plurality of displays is in a dominant display position and the first display of the plurality of displays is in a subservient display position when the handheld computing device is in the third orientation; and
modifying the plurality of displays such that a second application screen is expanded to be displayed in at least the first display and the second display in response to the change in orientation or the handheld computing device to the third orientation.

18. The method according to claim 15, wherein the first orientation comprises a portrait orientation.

19. The method according to claim 18, wherein the second orientation comprises a landscape orientation.

20. The method according to claim 15, wherein the sensing uses an accelerometer.

* * * * *

UNITED STATES PATENT AND TRADEMARK OFFICE
CERTIFICATE OF CORRECTION

| | | |
|---|---|---|
| PATENT NO. | : 8,749,484 B2 | Page 1 of 1 |
| APPLICATION NO. | : 12/948682 | |
| DATED | : June 10, 2014 | |
| INVENTOR(S) | : Alex de Paz | |

It is certified that error appears in the above-identified patent and that said Letters Patent is hereby corrected as shown below:

In the Claims:

Claim 15, column 22, line 12, after "sensing a rotation of" insert --the--.
Claim 15, column 22, line 26, delete "position" and insert --positioning--.

Signed and Sealed this
Sixteenth Day of September, 2014

Michelle K. Lee
*Deputy Director of the United States Patent and Trademark Office*